United States Patent [19]
Kokko

[11] Patent Number: 5,444,904
[45] Date of Patent: Aug. 29, 1995

[54] DEVICE FOR REPLACING THE KNIVES OF A DISC CHIPPER

[75] Inventor: Pekka Kokko, Hollola, Finland

[73] Assignee: Andritz-Patentverwaltungs-Gesellschaft m.b.h., Graz, Austria

[21] Appl. No.: 148,320

[22] Filed: Nov. 8, 1993

[30] Foreign Application Priority Data

Nov. 18, 1992 [FI] Finland ............................ 925226

[51] Int. Cl.6 ............................................. B27G 13/08
[52] U.S. Cl. ........................... 29/402.08; 241/92; 241/298; 144/176; 144/241
[58] Field of Search .................. 29/402.08, 464, 809; 241/92, 298, 300; 144/230, 176, 241

[56] References Cited

U.S. PATENT DOCUMENTS

| | | | |
|---|---|---|---|
| 1,691,983 | 11/1928 | Miller | 29/464 |
| 2,337,407 | 12/1943 | Ottersland | 144/176 X |
| 2,388,799 | 11/1945 | Payzer et al. | 241/92 |
| 3,144,995 | 8/1964 | Fontaine | 241/298 |
| 3,542,302 | 11/1970 | Salzmann, Jr. | |
| 3,905,558 | 9/1975 | Gaitten | 241/92 X |
| 3,981,337 | 9/1976 | Sundstrom | 144/241 |
| 4,694,995 | 9/1987 | Holmberg et al. | |
| 5,139,063 | 8/1992 | Nettles et al. | 241/298 X |
| 5,271,440 | 12/1993 | Bradstreet, Jr. et al. | 144/241 X |
| 5,291,652 | 3/1994 | Vossen et al. | 29/809 X |

FOREIGN PATENT DOCUMENTS 78412 10/1983 Finland.
903733 7/1990 Finland.

Primary Examiner—Timothy V. Eley
Assistant Examiner—Khan V. Nguyen
Attorney, Agent, or Firm—Birch, Stewart, Kolasch & Birch

[57] ABSTRACT

A knife (12) are a holding and releasing mechanism (8) are oriented in the direction of a radius of a chipper disc (19). The holding and releasing mechanism (8) is pushed in the direction of the radius of the chipper disc to release the knife (12) and drawn in the opposite direction to fasten the knife in the chipper disc (19). The time consumed in replacing the knives is reduced and laborious manual operations can be avoided. The procedure can be automated.

12 Claims, 2 Drawing Sheets

DEVICE FOR REPLACING THE KNIVES OF A DISC CHIPPER

FIELD OF THE INVENTION

The present invention relates to a procedure for replacing the knives of a disc chipper, said procedure comprising a knife or knife assembly and its holding elements, said knife being mounted in a radial or nearly radial orientation in the chipper disc. The invention also relates to a device implementing the procedure.

DESCRIPTION OF THE BACKGROUND ART

Chippers are used for the production of chips e.g. from logs for pulping or for use as fuel. The chipper knives are subject to heavy wear due to the high utilization rate of the chipping plants and to the presence of detrimental impurities in the wood material being chipped. Thus, replacing the chipper knives is an operation that is normally repeated daily or once during each working shift.

In disc chippers employing previously known knife holding systems, the knife is detached and attached manually by loosening or tightening the knife holding screws. These generate a force that holds the knife or knife holding element in place. Due to the large number of knife holding screws (about 60 . . . 120 pcs for each chipper disc), changing the knives is an operation that requires plenty of work and time. Moreover, to loosen and tighten the screws, heavy wrenches are needed. Replacing the knives in a chipper disc normally requires about 1 h of time, which means about 250 h of work in a year. Thus, at the yearly level, the replacement of the chipper knives is the biggest factor reducing the utilization rate of the chipping plant.

The disposable knives of disc chippers are typically replaced either by detaching the knife directly from its holding elements in the chipper disc, or, in addition to loosening the holding element, by releasing some other part as well, usually the knife holder. The old knife is extracted from its seat between the tool carrier and the tool holder and replaced with a new one, whereupon the loosened holding elements are tightened again.

Publication FI 78412 presents a reversible-bit-type disposable knife. The knife is replaced at the chipper by loosening the screws in the appropriate part of the chipper disc, drawing out the knife longitudinally, inserting a new knife and tightening the screws. U.S. No. Pat. 3,542,302 discloses a traditional regrindable knife. When mounting a reground knife, the correct chipping height is set by means of setting elements.

In addition to the above-mentioned procedures, other techniques for faster replacement of the knives of a disc chipper have been developed. Among these is a hydraulic knife releasing method, presented e.g. in Finnish application no. 903733, which involves the use of a hydraulic thrust device to produce a force for the loosening of the knife holding elements.

Also previously known is the use of the centrifugal force for the holding of the knifes, but the magnitude of the centrifugal force alone is not sufficient because of the lower speed of rotation of the chipper disc. Employing the centrifugal force would require the use of extra large masses or transmission systems increasing the force. Use of the centrifugal force alone for holding the knives is applicable e.g. to the drumlike chipper disc of a high-speed planer, in which the knives are placed on the periphery of the chipper disc and which allows the use of fairly large masses on the periphery of the drum, the effect of the centrifugal force being applied to these masses to hold the knives.

SUMMARY OF THE INVENTION

The object of the present invention is to achieve a cheap procedure which reduces the time required at the chipper for the replacement of the knives. Another object is to avoid the use of heavy manual tools as compared to previously known knife replacement systems. A further object is to produce a procedure which can be used in connection with automated knife replacement.

The features of the procedure of the invention and those of the device designed to implement it are presented in the claims.

The invention provides the advantage of reducing the time consumed in changing the knives and therefore the duration of the outage caused by the replacement. Moreover, no heavy and noisy manual tools are needed for the replacement of the knives, which means that the task becomes more pleasing and the risk of accident is reduced. Another important advantage is that the equipment implementing the procedure of the invention can be easily adapted to existing disc chippers and the knife changing operation can also be automated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described by referring to the drawings which are given by way of illustration only, and thus are not limitative of the present invention, and among which

DETAILED DESCRIPTION OF THE PREFERRED EMBODIMENTS

Figure 1:
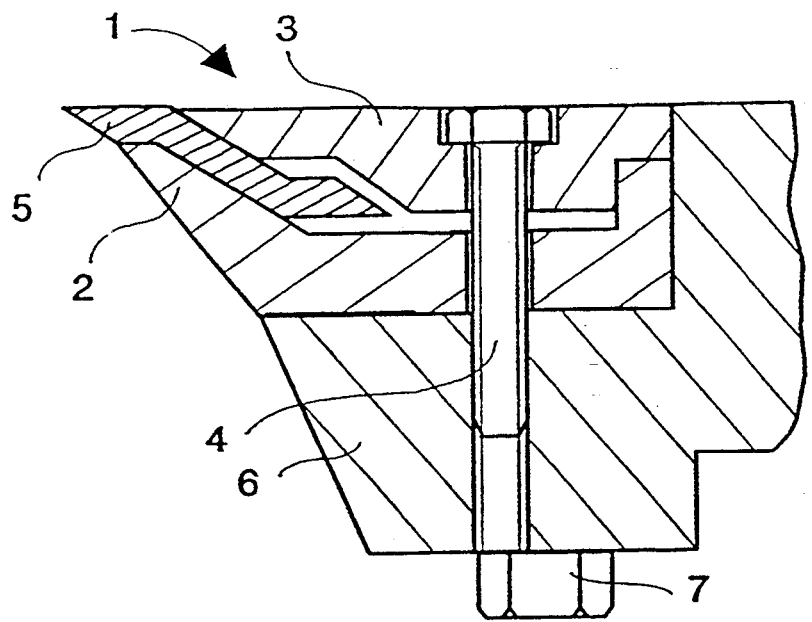
FIG. 1 presents a previously known device.

FIG. 1 presents a typical device I previously known in the art. It comprises a tool carrier 2, a tool holder 3, and screws 4 for fastening the tool carrier 2, tool holder 3 and the tool between them to the chipper disc 6. The tool carrier is fixed to the chipper disc by a screw 7. To replace the knife 5, the screws 4 are loosened and the used knife is removed and replaced with a new one. One chipper disc may have 60 . . . 120 screws which have to be loosened and tightened.

Figure 2:
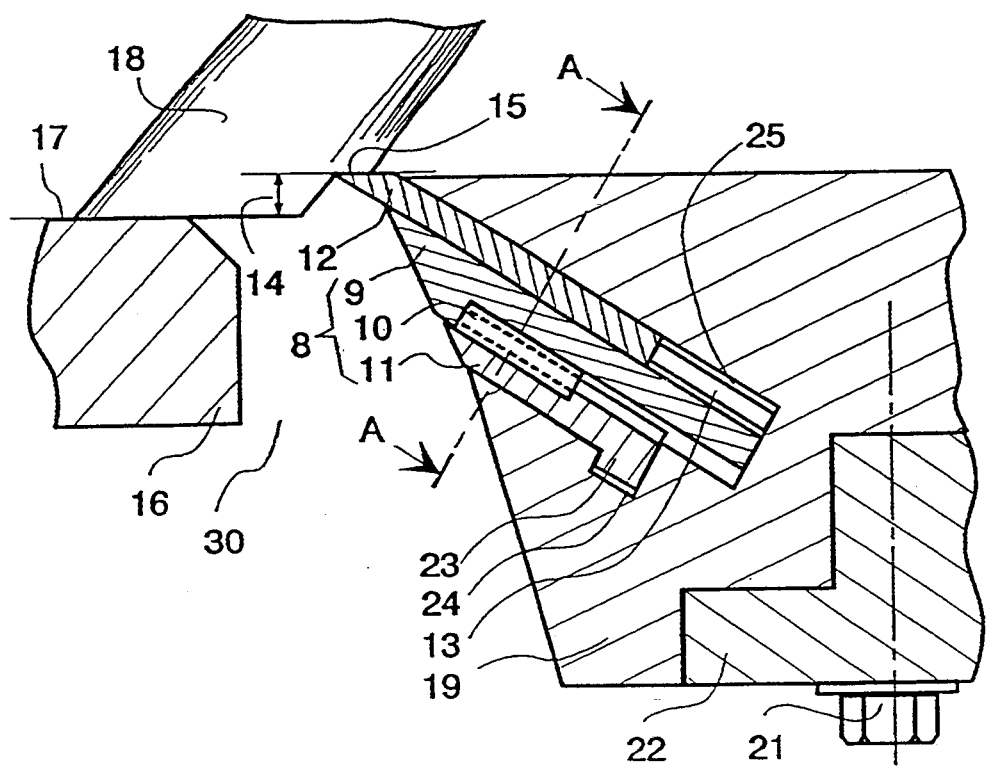
FIG. 2 illustrates the knife attachment according to the invention.

FIG. 2 presents a device designed for implementing the procedure of the invention. The figure shows the position of one knife in the chipper disc of a disc chipper as seen from the direction of the radius of the chipper disc. The knife 12 is placed in a slot 25 provided in the chipper disc 19, said slot being oriented radially relative to the chipper disc 19 and obliquely relative to the log 18 to be chipped. The length of the slot 25 approximately equals that of the radius of the chipper disc. The log 18 rests on the surface 17 of part 16 of the disc. The chipper disc 19 can be fixed to disc part 22 with a screw 21. Distance 14 represents the chipping height, which can be adjusted by means of a setting element 13.

Regarding the idea of the invention, the essential part is a holding and releasing mechanism 8 pressing the knife against the chipper disc. This mechanism is placed in the slot 25 oriented in the direction of the radius of the chipper disc and consists of an adapter 9 acting as a tool carrier, a holding element 11 with a tolerance allowing some back-and-forth movement in the slot 25, and an elastic element 10 between the adapter 9 and the holding element 11. The tool holding and releasing system of the invention works equally well if instead of the holding element 11 the adapter 9 is movable, or if both of these parts are movable. Moreover, disc part 19 is provided with another slot 24 retaining the holding element 11 by a shoulder 23.

As appears from FIG. 2, the holding and releasing mechanism 8 has a structure and a shape which allow it to be easily installed in existing chipper discs.

Figure 3:
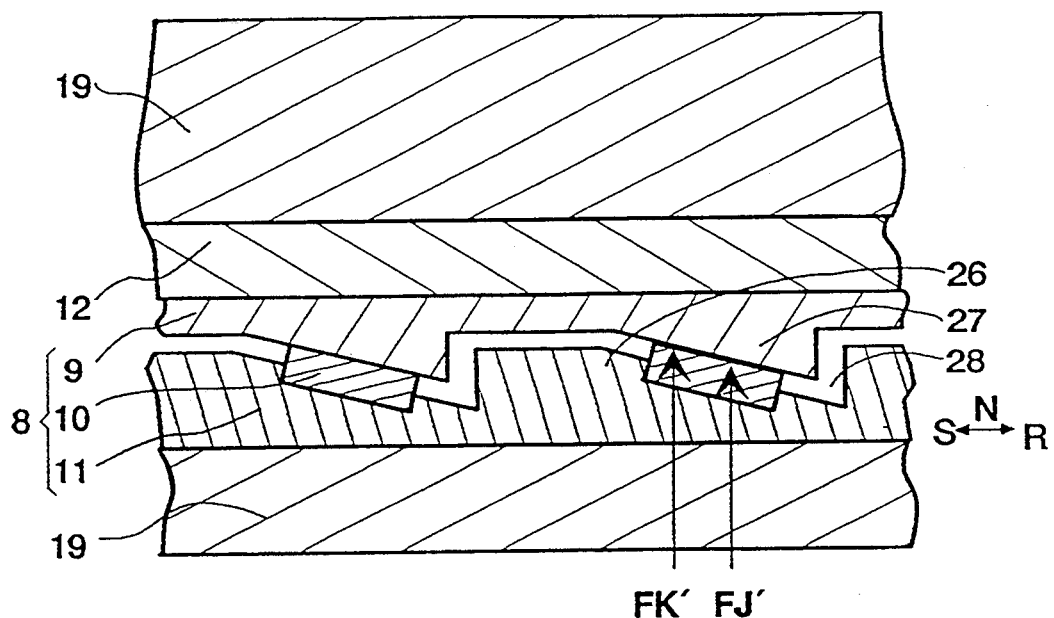
FIG. 3 presents a detail of the knife attachment taken along line A—A of FIG. 2.

FIG. 3 shows a part of the section A—A in FIG. 2, taken in the direction of the radius of the disc. Arrow N represents the orientation, S indicating the side oriented towards the shaft of the chipper disc and R the side oriented towards the periphery. The holding element 11 is provided with several protruding chocks 26 and the adapter 9 is provided with a corresponding number of counterchocks 27. Between the chock and the counterchock there is an elastic element 10. The clearance 28 between the chocks changes somewhat as the elastic element 10 is compressed. A suitable material for the elastic element 10 is e.g. elastic plastic, or it may also consist of a cup spring. Alternatively, the elastic element 10 may also be placed between the holding element 11 and the chipper disc 19. As the chipper disc rotates about its shaft 29, the centrifugal force generated creates inertia forces which cause the holding element 11 to move through a distance L1 in direction R, with the result that chock 26 is pressed against counterchock 27 of the adapter 9, the pressure being transmitted via the elastic element 10, so that a force FK' generated by the centrifugal force is applied to the knife 12. The mechanism is provided with several elastic elements 10 placed in the lengthwise direction of the knife so as to distribute the holding force evenly over the whole length of the knife.

To fasten the knife 12, another force FJ' is also applied against the chipper disc via the holding and releasing mechanism 8. Thus, the force fixing the knife against the chipper disc is the sum of forces FK' and FJ'. To release the knife, forces acting in the opposite direction are required.

Figure 4:
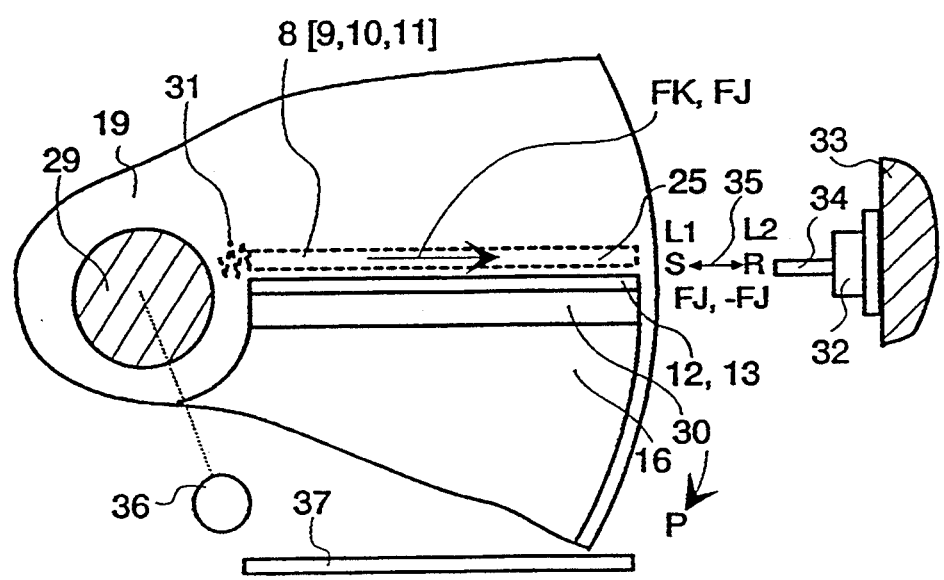
FIG. 4 illustrates the invention as applied to a disc chipper.

FIG. 4 presents a disc chipper as seen from the direction of the shaft 29 of the chipper disc 19. The chipper disc rotates about the shaft in direction P. A power means 31, preferably e.g. a spring, is provided between the holding element and the chipper disc, at that end of the holding element 11 which points towards the disc shaft 29. The spring pushes the holding element 11 towards the periphery of the chipper disc (direction R), producing a movement L1 which, by means of the chocks 26 and 27 and the elastic element 10 presented in FIG. 3, is transmitted as a force FJ' applied to the knife. As the chipper disc 19 rotates, the holding and releasing mechanism 8 is subjected to a centrifugal force FK, which is also transmitted by means of the chocks 26 and 27 and the elastic element 10 as a force FK' holding the knife. Furthermore, the disc chipper equipment comprises a power unit 32, which may be mounted on the chipper 33 or on the building structures surrounding it. The power unit 32 is used to generate the movement L1 (force —FJ) required for the release of the knife 12, and it can also be used to produce the movement L2 (force FJ) needed to fasten the knife, or both. Thus, the power unit 32 may work in cooperation with the spring 31 so that the knife holding force FJ is generated by the spring 31 and the force —FJ required to release the knife is generated by the power unit 32. Since the centrifugal force naturally disappears when the chipper disc is stopped, there is no need to generate a force —FK opposing the holding force FK generated by the centrifugal force.

To replace a knife, the following procedure is observed:

The chipper disc is rotated until the holding element 11 lies opposite to the power unit 32. The power unit 32 is activated, whereupon its spindle 34 pushes the holding element 11 towards the shaft 29 against the spring 31, producing a force —FJ contrary to the force FJ, releasing the knife. The adapter 9 and the knife are thus loosened. The used knife 12 is extracted from its slot and a new knife is inserted in its place. The power unit 32 is stopped, whereupon the spindle 34 withdraws and the knife 12 becomes fixed between the chipper disc 19 and the adapter 9.

Automatic knife replacement is implemented by providing the chipper disc with a device 36 which rotates the disc slowly and automatically positions the holding and releasing mechanism 8 so that it lies opposite to the spindle 34 of the power unit 32. An automatic knife changer 37 extracts the used knife 12 from the chipper disc 19 and automatically inserts a new one to replace the used knife in the chipper disc.

It is obvious to a person skilled in the art that different embodiments of the invention are not restricted to the examples described above, but that they may instead be varied within the scope of the following claims.

What is claimed is:

1. A device for fastening and replacing a knife of a disc chipper, each in a single step, the disc chipper including a chipper disc rotatable about a rotational axis, the device comprising in combination a knife holding element provided with at least one elastic element for distributing holding forces to the knife, means for moving said knife holding element in a radial direction of the chipper disc, the knife holding element being movable toward the rotational axis to release the knife from the disc chipper and the knife holding element being movable away from the rotational axis to fasten the knife to the disc chipper.

2. The device according to claim 1, wherein the knife holding element comprises a holding and releasing mechanism which includes at least a holding element and an adapter, at least one of the holding element and the adapter being radially movable when the knife holding element moves toward and away from the rotational axis of the chipper disc.

3. The device according to claim 2, wherein the holding element and the adapter are both provided with wedge-shaped protrusions, the containing said elastic element interposed between the holding element and the adapter, the wedge-shaped protrusions and the elastic element transmitting a force to hold the knife in the knife holding element.

4. The device according to claim 3, wherein the elastic element is placed in a lengthwise direction of the knife.

5. The device according to claim 1, wherein the knife and the knife holding element extend along a direction which is non-parallel and non-perpendicular to the rotational axis of the chipper disc.

6. A device for fastening and replacing a knife of a disc chipper, each in a single step, the disc chipper including a chipper disc rotatable about a rotational axis, the device comprising in combination a knife holding element containing a holding and releasing mechanism which includes at least a holding element, an adapter and at least one elastic element disposed between the holding element and the adapter, said holding element and adapter being provided with wedge-shaped protrusions, said wedge shaped protrusions and the elastic element transmitting a force to hold the knife in the knife holding element, means for moving the knife holding element, in the radial direction of the chipper disc, toward and away from the rotational axis of the chipper disc, and a spring for urging the holding element away from the rotational axis of the chipper disc, the spring being disposed between the chipper disc and the holding element, the spring generating a force (FJ') and rotation of the chipper disc generating a centrifugal force (FK'), which forces (FJ', FK') urge the elastic element against the adapter to hold the knife in the knife holding element, the forces (FJ', FK') urging the holding element away from the rotational axis, the centrifugal force (FK') terminating when rotation of the chipper disc stops.

7. The device according to claim 6, further comprising a power element for moving the holding and releasing mechanism toward the rotational axis of the chipper disc, the power element overcoming the force (FJ') of the spring such that the knife can be removed from the knife holding element.

8. A device for fastening and replacing a knife of a disc chipper, the disc chipper including a chipper disc rotatable about a rotational axis, the device comprising in combination a knife holding element, means for moving the knife holding element in a radial direction of the chipper disc toward and away from the rotational axis of the chipper disc, the knife holding element being movable toward the rotational axis to release the knife from the disc chipper and the knife holding element being movable away from the rotational axis to fasten the knife to the disc chipper, said device further comprising a spring between the chipper disc and the knife holding element, said spring urging the knife holding element away from the rotational axis of the chipper disc such that the knife holding element holds the knife of the chipper disc, the movement of the knife holding element toward the rotational axis overcoming the force of the spring and enabling the knife to be released from the knife holding element and to be removed from the chipper disc such that a new knife can thereafter be inserted into the knife holding element.

9. A device for fastening and replacing a knife of a disc chipper, the disc chipper including a chipper disc rotatable about a rotational axis, the device comprising in combination a knife holding element means for moving the knife holding element in a radial direction of the chipper disc toward and away from the rotational axis of the chipper disc, the knife holding element being movable toward the rotational axis to release the knife from the disc chipper and the knife holding element being movable away from the rotational axis to fasten the knife to the disc chipper, wherein the means for moving the knife holding element comprises a power unit with a spindle, the spindle being moved by the power unit toward and away from the rotational axis of the chipper disc, when the spindle moves toward the rotational axis, the knife holding element being engaged and simultaneously moved toward the rotational axis, the spindle being movable away from the rotational axis after the knife in the knife holding element is replaced.

10. A device for fastening and replacing a knife of a disc chipper, the disc chipper including a chipper disc rotatable about a rotational axis, the device comprising in combination a knife holding element, means for moving the knife holding element in a radial direction of the chipper disc toward and away from the rotational axis of the chipper disc, the knife holding element being movable toward the rotational axis to release the knife from the disc chipper and the knife holding element being movable away from the rotational axis to fasten the knife to the disc chipper, said device further comprising a power unit for moving the knife holding element toward the rotational axis of the chipper disc; a knife changer provided with a plurality of knives; means for extracting a knife from the knife holding element and for inserting another knife from the knife charger into the knife holding element; and means for rotating the chipper disc and for aligning the knife holding element with the power unit, whereby the power unit moves the knife holding element toward the rotational axis such that the means for extracting can remove the knife from the holder and thereafter insert a new knife into the knife holder.

11. The device according to claim 10, further comprising a spring between the chipper disc and the knife holding element, the spring urging the knife holding element away form the rotational axis of the chipper disc such that the knife holding element holds the knife of the chipper disc, movement of the knife holding element toward the rotational axis by the power unit overcomes force of the spring and enables the knife to be released from the knife holding element.

12. The device according to claim 11, wherein the power unit includes a spindle, the spindle being moved by the power unit toward and away from the rotational axis of the chipper disc, when the spindle moves toward the rotational axis, the knife holding element is engaged and simultaneously moved toward the rotational axis, the spring moving the spindle away from the rotational axis after the knife in the knife holding element is replaced and when the spindle moves away from the rotational axis.

* * * * *